United States Patent
Ren et al.

(10) Patent No.: US 10,578,944 B2
(45) Date of Patent: Mar. 3, 2020

(54) QUANTUM DOTS-INTEGRATED INORGANIC-ORGANIC HYBRID NANORODS FOR CONTROLLING LIGHT TRANSMISSION AND METHOD OF MAKING THE SAME

(71) Applicant: 1-Material Inc, Dorval (CA)

(72) Inventors: Fuqiang Ren, Longueuil (CA); Shengyun Huang, Longueuil (CA); Dongling Ma, Pointe-claire (CA); Shiyong Zhao, Longueuil (CA); Dawei Zhang, Lachine (CA); Yanan Li, Monteal (CA); Shuyong Xiao, St-Laurent (CA)

(73) Assignee: ZHEJIANG JINGYI NEW MATERIAL TECHNOLOGY CO., LTD, Taizhou, Zhejiang (CN)

( * ) Notice: Subject to any disclaimer, the term of this patent is extended or adjusted under 35 U.S.C. 154(b) by 0 days.

(21) Appl. No.: 16/044,863

(22) Filed: Jul. 25, 2018

(65) Prior Publication Data

US 2020/0033690 A1 Jan. 30, 2020

(51) Int. Cl.
| | | |
|---|---|---|
| G02B 26/00 | (2006.01) | |
| G02F 1/03 | (2006.01) | |
| G03G 17/04 | (2006.01) | |
| G09G 3/34 | (2006.01) | |
| G02F 1/17 | (2019.01) | |

(52) U.S. Cl.
CPC ........ *G02F 1/172* (2013.01); *G02F 2202/108* (2013.01); *G02F 2202/16* (2013.01); *G02F 2202/36* (2013.01)

(58) Field of Classification Search
CPC .......... G02F 1/07; G02F 1/0123; G02F 1/167; G02F 2001/1678; G02F 1/172; G02F 2001/1672; G02B 26/026; G02B 26/001
USPC ........ 359/296, 265–277, 245–247, 242, 241, 359/237–238, 265–270, 290–291, 359/303–304, 321, 253–254, 298; 430/31–32; 345/49, 105, 107; 438/929; 349/33, 71, 106; 362/84, 231, 555, 583, 362/284, 322, 324
See application file for complete search history.

(56) References Cited

U.S. PATENT DOCUMENTS

| | | | | |
|---|---|---|---|---|
| 2004/0118448 | A1* | 6/2004 | Scher ..................... | B82Y 10/00 136/252 |
| 2009/0052029 | A1* | 2/2009 | Dai ........................ | B82Y 20/00 359/485.02 |
| 2013/0174778 | A1* | 7/2013 | Vela Becerra ............ | C30B 7/14 117/68 |
| 2018/0327661 | A1* | 11/2018 | Olmeijer .............. | C09K 11/025 |

* cited by examiner

*Primary Examiner* — Dawayne Pinkney
(74) *Attorney, Agent, or Firm* — Yue (Robert) Xu; Apex Attorneys at Law, LLP

(57) ABSTRACT

The present invention provides quantum dots-integrated inorganic-organic hybrid nanorods and the method to make such nanohybrids. It also provides a method to assemble light transmission controlling devices using the nanohybrids provided in this invention. In this invention, the developed nanohybrids for particular light controlling devices, more specifically SPDs have been disclosed.

11 Claims, 7 Drawing Sheets

Without voltage

With voltage

QUANTUM DOTS-INTEGRATED INORGANIC-ORGANIC HYBRID NANORODS FOR CONTROLLING LIGHT TRANSMISSION AND METHOD OF MAKING THE SAME

TECHNICAL FIELD

This invention provides a production process by which quantum dot-integrated inorganic-organic hybrid nanorods can be obtained. These nanohybrids can not only absorb photons over a wide wavelength range, but also are highly responsive to electric fields, which make them excellent candidates as light control particles. The light-transmission controlling devices developed based on these functional nanohybrids, which show unique and versatile characteristics, are highly desirable for important applications, such as windows, lenses, and sunroofs.

BACKGROUND ART

Energy consumption of residential and commercial buildings is responsible for nearly 40% of the total energy use in the word. In a typical building, windows could be the major source of energy loss, or gain, depending on their design. For modern buildings, the design of energy saving and environmentally-friendly atmosphere is becoming more and more important. To this end, using solar-adjustable smart windows to replace current static windows could be an efficient way. Smart windows with tunable transmittance levels can block or reflect sunlight on scorching days to lower energy consumption by air conditioning appliances. Such windows can also be put in a transparent state to improve light harvesting in a low lighting condition, or to enhance heat capture in cold weather. Moreover, with such a technology, depending on personal preferences, transmission of solar radiation into buildings can be controlled, so as to tune visual contact between indoors and outdoors for privacy and comfort.

In recent years, various reversibly switchable smart windows have been investigated and developed. Among them, smart windows based on chromogenic materials, liquid crystals and suspended particles have been attracting increased attention. Basically, there are four kinds of materials that can be used for chromogenic windows: electrochromic, photochromic, thermochromic and gasochromic. However, these chromogenic devices have some drawbacks that are not suitable for commercially large-scale fabrication and building applications. For example, electrochromic windows [U.S. Pat. No. 8,164,818B2] that can achieve tunability by oxidation/reduction reactions of chromogenic materials driven by the insertion/extraction of ions and electrons are not structurally stable because chemical reactions are involved. Thermochromic windows [U.S. Pat. No. 9,442,313B2] suffer from high transition temperature, low visible transmittance, unattractive visible colors and limited modulation. Liquid crystal devices [U.S. Pat. No. 3,731,986A] are usually limited to fabrication on rigid glass substrates and require continuous power supply, which entails a high power consumption. Their long-term ultraviolet (UV) instability and high cost remain critical issues as well.

Suspended particle-based smart devices, also called dipole particle suspension devices [US20130033741A1] usually use elongated, rod-like particles as an active light-controlling component. Their operation is based on the variation of orientation of elongated particles upon the application of an external electric field, which changes the optical absorption, reflection and scattering of composites, and thereby the transmission of the photon flux. The suspended particle device (SPD) has two distinctly different states: on and off. When an external electric field is applied, the particles are polarized and rotate under the torque exerted by the electric field and align themselves with applied field. As a result of increased particle alignment, more photons can pass through the medium and light transmittance increases. When the electric field is switched off, particles relax and become randomly oriented in the medium, thereby blocking more photons. Because the operation of these SPDs is based on the polarization and rotation of particles, which is essentially a physical process, such devices are free form the issues associated with electrochromic windows, as mentioned above. Different from most of the liquid-crystal devices, SPDs can integrate well on flexible substrates with low power consumption, therefore they have another advantage for next generation of flexible, low-cost smart windows.

Quantum dots (QDs), also referred to as semiconductor nanocrystals, are normally composed of II-VI, IV-VI or III-V compounds. They have attracted considerable attention in the past two decades due to their potential applications in light-emitting diodes, solar cells, and diodes lasers owing to not only their unique optical features, such as broad excitation spectra, narrow emission bands, high molar extinction coefficient, size-dependent optical absorption and emission spectra, but also their room temperature solution processibility, facile fabrication of multijunction solar cells and potentially efficient multiple exciton generation and hot electron extraction. Typically, the QDs are smaller than 100 nm in dimension and show novel properties different from their bulk counterparts. Near-infrared (NIR) emitting QDs, which can be tuned to emit from below 1000 to several thousand nanometers, are particularly interesting. Compared with visible (vis) QDs (e.g., CdS and CdSe), NIR QDs, such as PbS, $Ag_2S$, PbSe, absorb photons not only in the UV and vis ranges, but also in the NIR range. They have been directly used and have also been coupled with various other materials for diverse applications. For example, D. Ma' group [Adv. Funct. Mater. 2011, 21, 4010] successfully coupled PbS QDs with multi-walled carbon nanotubes and then integrated this nanohybrid with a hole transporting polymer of poly(3-hexylthiophene) (P3HT) to fabricate bulk heterojunction solar cells, which considerably extend the photon-to-charge carrier conversion into the NIR range and exhibit a largely enhanced power conversion efficiency of ~18% as compared to the control P3HT: [6,6]-Phenyl-C 61-Butyric Acid Methyl Ester (PCBM) solar cell fabricated under the same conditions.

Considering the unique properties of the QDs, in particular, their broad absorption and large absorption coefficients, their combination with suspended particles (for example organometallic nanorods) is expected to lead to the improvement of tunability of optical properties over a wide wavelength range.

The objective of the present invention is to provide quantum dots integrated organometallic nanorods and the method to make such a nanohybrid.

It is now also the objective of the present invention to provide a method to assemble a light transmission controlling device using the nanohybrids in this invention.

SUMMARY OF THE INVENTION

The present invention provides quantum dots-coupled organometallic nanorods and the method to make such a nanohybrid.

The present invention also provides a method to assemble a light-transmission controlling device using the nanohybrids provided in this invention.

BRIEF DESCRIPTION OF THE DRAWINGS

The present invention provides quantum dots-integrated inorganic-organic hybrid nanorods and the method to make such nanohybrids. It also provides a method to assemble light transmission controlling devices using the nanohybrids provide in this invention. In this invention, the developed nanohybrids for a light controlling device, more specifically a SPD has been disclosed.

DETAILED DESCRIPTION OF THE INVENTION

The present invention provides quantum dots-integrated inorganic-organic hybrid nanorods and the method to make such a nanohybrid. Firstly, the PbS QDs were synthesized by hot injection method, then these QDs were capped another CdS shell to form PbS/CdS core/shell QDs. Secondly, these QDs were combined with organometallic nanorods to form nanohybrids. This invention also provides a method to assemble light-transmission controlling devices using the nanohybrids provide in this invention. In this invention, the developed quantum dots-integrated inorganic-organic hybrid nanorods for particular light controlling devices, more specifically SPDs has been disclosed.

Figure 1:
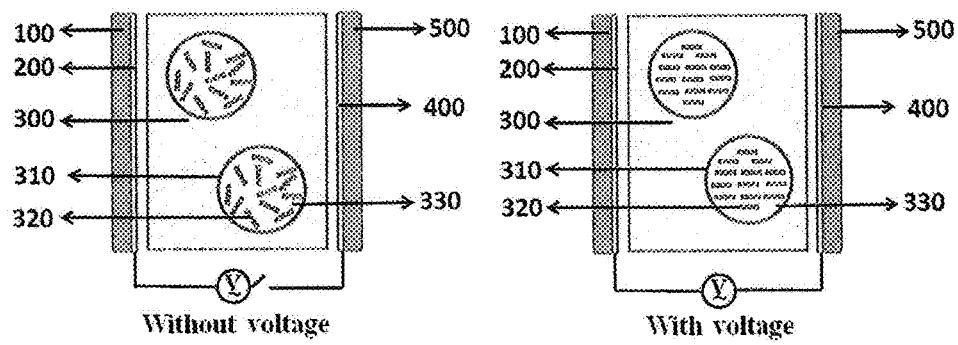
FIG. 1 presents schematically the light controlling device, wherein, 100 is a transparent substrate, 200 is layer of conductive film, 300 is layer of a polymeric matrix containing suspended quantum dots-integrated inorganic-organic hybrid nanorods (310) in droplets (320), 330 is a suspension medium in which the nanohybrids suspend or float, 400 is another layer of conductive film, and 500 is another transparent substrate.
Figure 2:
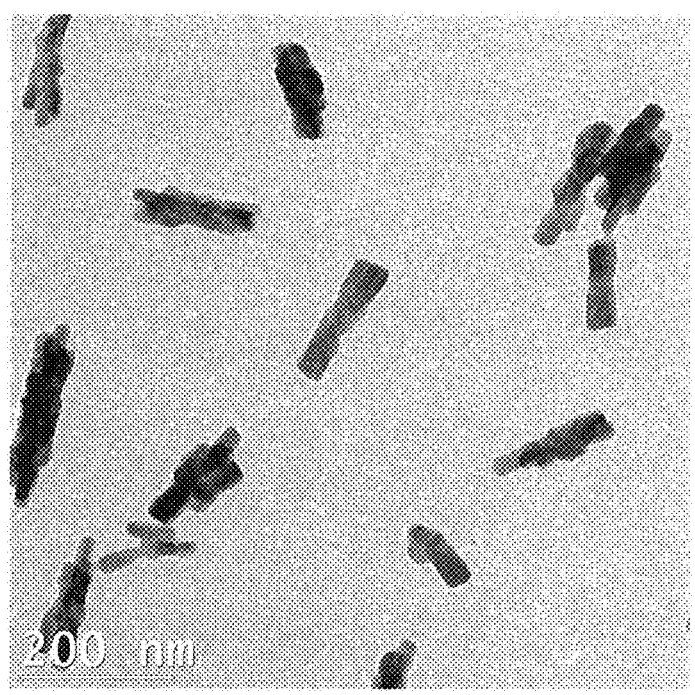
FIG. 2 presents a TEM image of the organometallic nanorods.
Figure 3:
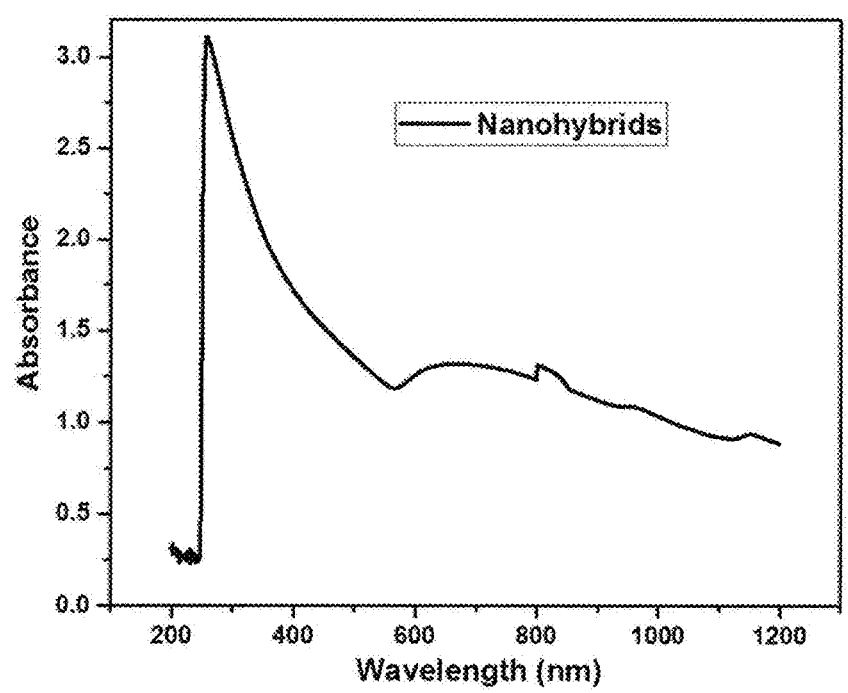
FIG. 3 presents absorption spectrum of the organometallic nanorods. It is normalized at the maximum absorption wavelength.
Figure 4:
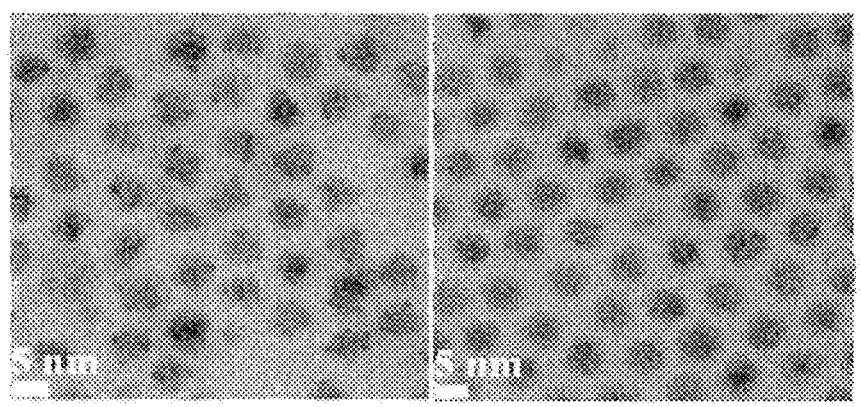
FIG. 4 presents TEM images of the synthesized PbS (left) and PbS/CdS (right) QDs
Figure 5:
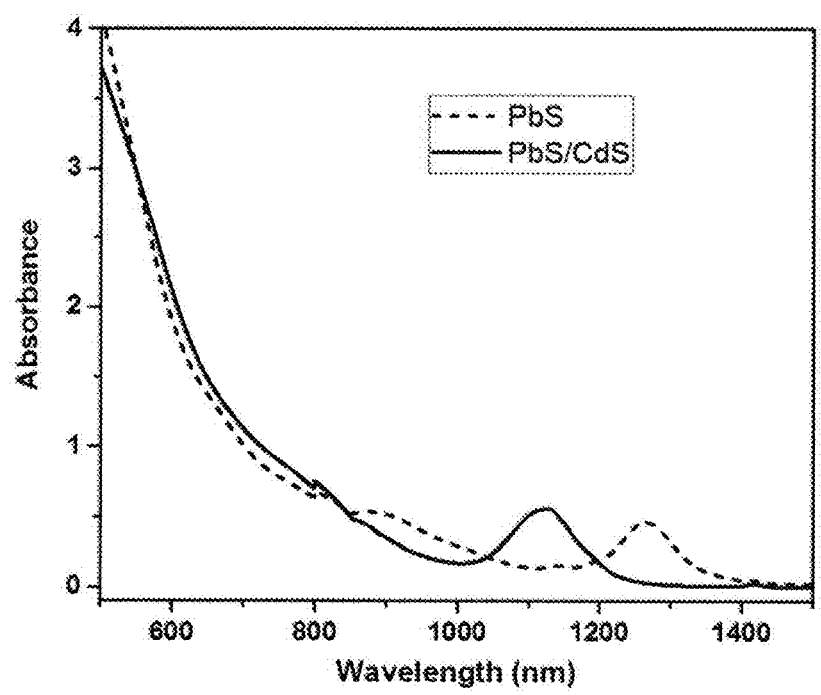
FIG. 5 presents absorption spectra of the synthesized PbS (black line) and PbS/CdS (red line) QDs.
Figure 6:
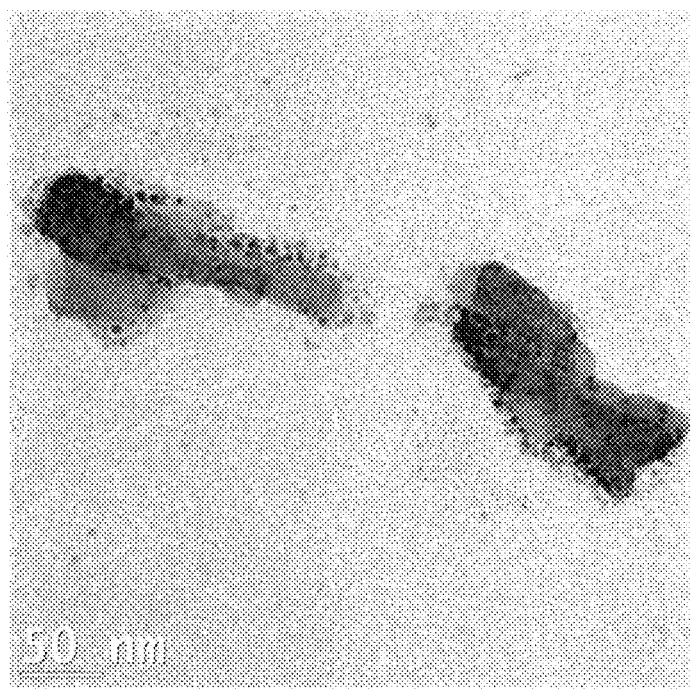
FIG. 6 presents TEM images of the synthesized quantum dots-integrated inorganic-organic hybrid nanorods.
Figure 7:
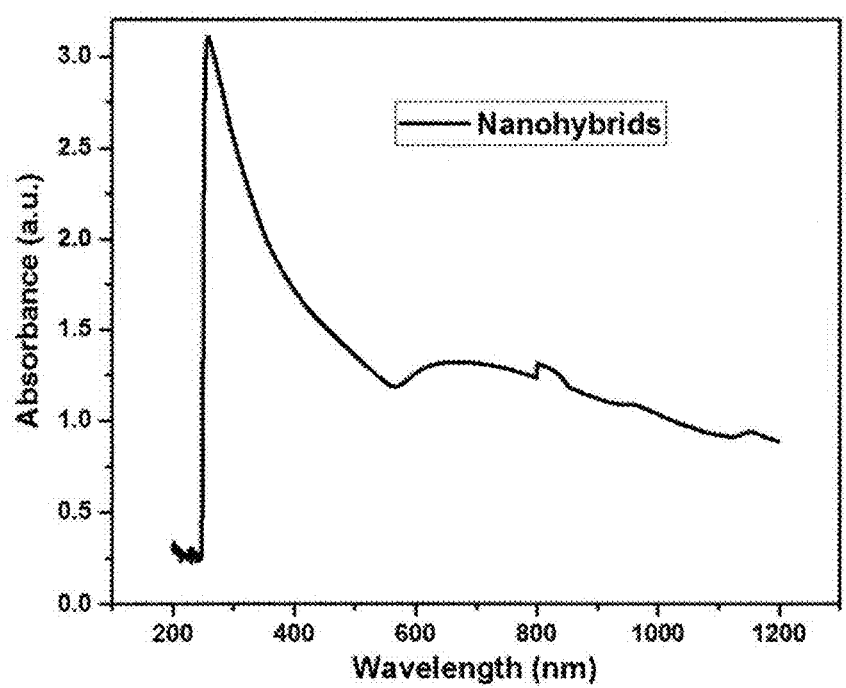
FIG. 7 presents absorption spectra of the synthesized quantum dots-integrated inorganic-organic hybrid nanorods in this invention.

FIG. 1 schematically illustrates a light controlling device, specifically a SPD, wherein, 100 is a transparent substrate, 200 is layer of conductive film, 300 is layer of a polymeric matrix (PM) containing suspended quantum dots-integrated inorganic-organic hybrid nanorods (310) developed in this invention in droplets (320), 330 is a suspension medium (SM) in which the nanohybrids suspend or float, 400 is another layer of conductive film, and 500 is another transparent substrate. Technically, it is specifically preferable that the refractive index of PM and suspension medium is about equal, more preferably within 1% difference.

According to this invention as illustrated in FIG. 1, the said transparent substrates 100 and the said transparent substrates 500 can be made of the same material or different materials, where light can be transmitted through, preferably having a light transmittance equals to or greater than 80%, more preferably 90%. Either the said transparent substrates 100 or the said transparent substrates 500 can be glass or plastic including but not limited to polyethylene terephthalate (PET), polyethylene (PE), polyethylene naphthalate (PEN), polymethyl methacrylate (PMMA) and polycarbonate (PC). Even though there is no restriction in choosing the said transparent substrates 100 and 500, they are preferred to be of the same material for the simplicity of processing and for the same physical properties (such as flexibility and thermal expansion), important for device durability under certain conditions, such as thermal stress.

According to this invention as illustrated in FIG. 1, both the 200 and 400 conductive films are preferably to be the same in order to have a similar optical effect at the both sides of the active layer which contains suspended particles (310) in droplets (320) and the PM, so the light can be controlled in a symmetric manner, which eventually helps to reduce the haze effect of the device.

In this invention, the quantum dots-integrated inorganic-organic hybrid nanorods were first prepared. According to this invention, the PbS QDs was synthesized by hot injection method. The size of the QDs was adjusted and optimized for balancing the optical properties of core-shell QDs by manipulating surface chemistry and ligands and by varying reaction time. The above variables were systematically screened and, hence suitable QDs of certain diameter was finally identified. In order to improve the stability of the QDs, another CdS shell was synthesized around the initial PbS QDs to form a core/shell structure. In this invention, the quantum dots-integrated inorganic-organic hybrid nanorods were prepared by using Triton X-100 as surfactant. The TEM image clearly demonstrates the success in anchoring the core/shell QDs onto the nanorods.

According to this invention as illustrated in FIG. 1, the said PM layer 300 is preferably a high light transmittance plastic material. More preferably, the said PM 300 can be formed by photo-curing, so the shrinkage of this layer can be technically controlled. Still more preferably, the said PM layer 300 is a cross-linked polysiloxane formed from liquid siloxane copolymer with ethylenically unsaturated bond by photo-curing method described in U.S. Pat. Nos. 6,900,923 and 7,791,788. Hereinafter, the photo-curable polysiloxane which is used to form the PM layer 300 is referred as the PM material. The optical transmittance is related to the thickness of the layer 300, and such a thickness is preferably between 20-200 μm, more preferably, 50-120 μm.

According to this invention as illustrated in FIG. 1, the said PM layer 300 embeds many droplets (320) and each droplet (320) encapsulates multiple particles (310), and these particles (310) are capable of re-orientation in an electronic field. Hereinafter, the droplet material (320) is also referred as the SM and the quantum dots-integrated inorganic-organic hybrid nanorods are also referred as light polarized particle (LPP) for scientific proposal.

As illustrated in FIG. 1, the SM, ie, the material to form droplets (320) shall be different from the PM material, and shall keep in a liquid form or at least a gel form within the PM. If the PM material is an acrylate, the said SM is preferably selected from silicone oil or TDTM (Tri-Isodecyl trimellitate), or a mixture of any two and more materials as listed in U.S. Pat. Nos. 6,900,923 and 7,791,788.

As illustrated in FIG. 1, the said LPPs (320) which are encapsulated inside the said droplets (310) shall be capable of re-orientating themselves in an electronic field. Not only shall the chemical nature of the LPP but also the geometric dimension be scientifically optimized. In terms of geometric dimensions, the organometallic nanorods are preferably having a length of about 100-500 nm, more preferably 150-300 nm, and a diameter of 20-100 nm, more preferably 30-60 nm. The material of the said organometallic nanorods is preferably selected from polyhalides and herapathite. It could also be inorganic titanium dioxide ($TiO_2$). More preferably, LPP is composed of calcium polyhalide, as listed in U.S. Pat. No. 8,520,294. The QDs combined with the nanorods are preferably having a diameter of about 1-15 m, more preferably. 2-8 nm. The chemical composition of the said QDs is preferably selected from CdS, CdSe, PbS, PbSe, $Ag_2S$, $CuInS_2$, CdSe, CdTe, ZnS, MgSe, GaAs, InAs, GaSb, SiC, SiGe, Si, Ge, C and core/shell PbS/CdS, CdSe/ZnS, CdSe/CdS, $CuInS_2$/ZnS, more preferably PbS and PbS/CdS QDs.

Practically according to this invention, the said PM (300) material, the said droplet SM (320) material and the said LPP (310) are formulated into an emulsion, hereinafter referred as SPD emulsion. The film formed from this emulsion can be sandwiched between two transparent conductive layer 200 and 400. Other additives including stabilizer and/or emulsifier can also be added into this formulated SPD emulsion.

In one embodiment, the layer 100 and the layer 500 are made of glass. Adhesive spacers were used to define the thickness and device geometry on one conductive film. The formulated SPD emulsion was then filled into the space defined by the spacers, and subsequently covered by another conductive film. Such an assembly was then exposed to UV-radiation to cure the emulsion and form the layer 300 between the layer 200 and the layer 400, ultimately a light controlling device as illustrated in FIG. 1 is completed.

In another embodiment, the layer 100 and the layer 500 are PET films. The formulated SPD emulsion was first applied onto one transparent conductive film (TCF) 200/100 by doctor blade method to achieve a thickness of about 100 μm, then was exposed to UV-radiation to cure the emulsion and form the layer 300 on top of the film of 200/100; finally another TCF film 400/100 was placed on the top of the layer 300 to complete the assembly of a light controlling device as illustrated in FIG. 1.

EXAMPLES

The invention will now be described in more detail with reference to the following examples. However, it should be understood that these examples are given for the purpose of illustration only and are not intended to limit the scope of the present invention.

Example 1. Synthesis of the Quantum Dots

In this example, smaller PbS (QDs; 2.7 and 2.9 nm in diameter) QDs were synthesized. In a typical procedure, a mixture of lead acetate trihydrate (760 mg), oleic acid (OA) (2.4 ml) and octadecene (ODE) (15 ml) was stirred and heated to 150° C. for 1 h under $N_2$ flow. It was then cooled to 130° C. under vacuum and the $N_2$ flow was recovered. After that, a mixture (2 ml) of bis(trimethylsilyl) sulfid and trioctylphosphine (1:10 ratio by volume) was quickly injected into the flask, resulting in a quick drop in temperature. The reaction was then quenched with cold water after about 5 minutes. The QDs were precipitated by centrifugation and then re-dispersed in cold hexane. After being kept at 4° C. for two days, the QD dispersion was centrifuged at 8000 rpm for 30 minutes and the sediment was discarded. Following methanol addition, the QD dispersion was centrifuged at 3000 rpm for 5 minutes. After the removal of the supernatant, the QDs were dispersed in toluene. This purification step was repeated one more time to yield PbS-QD-1

Example 2. Synthesis of the Quantum Dots

In this example, larger PbS QDs (3.4 to 6 nm in diameter) were synthesized by using oleylamine (OLA) as capping ligands. In a typical reaction, $PbCl_2$ (10 g) and OLA (24 mL) were heated by an oil bath to 160° C. and kept at this temperature for 1 h under the protection of $N_2$. The solution was then cooled to 120° C. and pumped for 30 min. The flask was then reopened and the $N_2$ flux was restored. Sulfur (115 mg) in oleylamine (4 mL) at room temperature was quickly injected into the $PbCl_2$-OLA suspension under vigorous stirring. The reaction cell was quenched with cold water after the reaction was conducted at 100° C. for 1-30 min to obtain PbS QDs of different sizes. The purification procedure was carried out in air using anhydrous solvents. Hexane and ethanol were added to the reaction solution followed by centrifugation to separate QDs. Obtained PbS QDs were purified one more time by redispersion and centrifugation processes to yield PbS-QD-2. Ligand exchange with oleic acid was then performed following routine procedure. Finally, the QDs were dispersed in toluene for characterizations or for the synthesis of PbS/CdS QDs.

Example 3. Synthesis of the Core/Shell Quantum Dots

In this example, core/shell QDs were synthesized by using microwave-assisted cation exchange approach. CdO (3 g), OA (15 mL) and ODE (20 mL) were mixed and heated to 200-250° C. by oil bath until the solution turned colorless. The mixture was cooled to 100° C. and degassed under vacuum for 30 min. The temperature was further decreased to 20° C. and 12 mL of PbS-QD-1 dispersion was added via syringe. Then, 20 mL of this mixture was introduced into a 35 mL microwave reaction tube and heated via microwave (Discover; CEM Corporation). The reaction was conducted at 100° C. for different time. To purify the PbS/CdS QDs, ethanol was added to precipitate the QDs. The precipitate was subsequently redispersed in toluene and again precipitated with ethanol. The redispersion/precipitation procedure was repeated additionally once or twice to yield the final core-shell PbS/CdS QD-3.

Example 4. Synthesis of the Organometallic Nanorods

In this example, the organometallic nanorods were synthesized by adopting a modified wet chemical method using nitrocellulose as a surface protective agent. Typically, 4.5 g of $I_2$, 3 g of $CaI_2$ and 13 g of nitrocellulose were dissolved in 137 mL of isoamyl acetate at room temperature, heated to 65° C. and kept at this temperature for 40 min under vigorous stirring. After the mixture was cooled down to 45° C., 3.5 g of pyrazine-2,5-dicarboxylic acid (2,5-PDA), 7.6 mL of methanol and 0.6 mL of deionized water were slowly added. The reaction mixture was maintained at 45° C. for 3 h with magnetic stirring, and then quenched to room temperature. After that, the mixture was ultrasonicated for 2 h to form a uniform dispersion. Finally, the product was washed several times with isoamyl acetate by going through centrifugation-redispersion cycles to remove excess chemical, and redispersed in isoamyl acetate to yield ONR-S-4.

Example 5. Synthesis of Quantum Dots Decorated Organometallic Nanorods

In this example, the quantum dots-integrated inorganic-organic hybrid nanorods were prepared by using Triton X-100 as surfactant. Ethanol was added to the toluene solution of PbS-QD-1 prepared in Example-1 or PbS/CdS-QD-3 prepared in Example-3 to precipitate the QDs. The precipitate was subsequently redispersed in isoamyl acetate and the concentration tuned to 0.6 mg/mL. Then 200 μL Triton X-100 was added into 10 mL QDs isoamyl acetate and stirred for 3 hours. 0.5 g organometallic nanorods ONR-S-4 prepared in Example-4 were added to the mixture and kept at the temperature of 40° C. for 12 hours under vigorous stirring. Finally, the product was washed 3 times with isoamyl acetate by going through centrifugation-redispersion cycles to remove excess chemical, and redispersed in isoamyl acetate to yield LPP solution LPP-S-5, which is ready for the next step of SPD preparation or all kinds of material characterizations.

Example 6. Fabrication of the SPD Device

In this example, a SPD device of 2 cm×2 cm was assembled using the adhesive spacer method with a thickness of 100 μm according to the typical procedure disclosed above, where the transparent substrate 100 is glass, the conductive film 200 is ITO, the layer 300 is PM, the 400 is conductive film, and the 500 is transparent substrate layer, suspension medium containing quantum dots-integrated inorganic-organic hybrid nanorods (LPP-S-5). The transmittance spectra of the SPD was taken on a Cary 5000 UV-Vis-NIR spectrophotometer (Varian).

REFERENCE CITED

U.S. Patent Documents

U.S. Pat. No. 8,164,818B2, Mark A. Collins et al. 2012
U.S. Pat. No. 9,442,313B2, Yongwon Choi et al. 2016
U.S. Pat. No. 3,731,986A, James L. Fergason et al. 1973
US20130033741A1, Shunsuke Mori et al. 2013
US2016202588A1, John David Bass et al. 2016
U.S. Pat. No. 3,585,381A, Theodore L Hodson et al. 1971
US20100014150, Osamu Higashida et al. 2010
US20100047593, Osamu Higashida et al. 2010
U.S. Pat. No. 6,900,923, Srinivasan Chakrapani et al. 2005
U.S. Pat. No. 7,791,788, Steven M, Slovak et al. 2010

None U.S. Patent Documents

Adv. Punct. Mater. 2011, 21, 4010

What is claimed is:

1. A light-transmission controlling device, comprising:
    a first layer of a transparent conductive substrate;
    an active layer; and
    a second layer of another transparent conductive substrate;
    wherein the active layer is arranged between the first layer and the second layer;
    wherein the active layer is a layer of polymeric matrix embedded with liquid drops, the liquid drops comprise a liquid suspension medium, inorganic-organic hybrid nanorods are suspended in the liquid suspension medium, and quantum dots are integrated in the inorganic-organic hybrid nanorods.

2. The light-transmission controlling device according to claim 1, wherein said quantum dots are PbS quantum dots.

3. The light-transmission controlling device according to claim 1, wherein said quantum dots are core-shell structured PdS/CdS quantum dots.

4. The light transmission controlling device according to claim 1, wherein said inorganic-organic hybrid nanorods are metallic complex of calcium containing organic ligand of nitrogen containing compounds.

5. The light-transmission controlling device according to claim 1, wherein said transparent substrate is ITO coated glass.

6. The light transmission controlling device according to claim 1, wherein said transparent substrate or said another transparent substrate is an ITO coated PET film.

7. The light-transmission controlling device according to claim 1, wherein said transparent conductive substrate or said another transparent substrate is a silver nanowire coated PET film.

8. The light-transmission controlling device according to claim 1, wherein said inorganic-organic hybrid nanorods is capable to absorb photons over a wavelength range from UV-Vis to NIR.

9. The light-transmission controlling device according to claim 1, wherein alignment of said inorganic-organic hybrid nanorods are responsive to electric fields.

10. The light transmission controlling device according to claim 1, wherein said layer of polymeric matrix has a thickness between 20 μm and 200 μm.

11. A method for synthesizing the inorganic-organic hybrid nanorods of the light-transmission controlling device according to claim 1, comprising:
    synthesizing the quantum dots;
    precipitating the quantum dots by adding ethanol to a toluene solution of the quantum dots;
    dispersing the precipitated quantum dots in isoamyl acetate;
    adding Triton X-100 into the precipitated quantum dots dispersed in isoamyl acetate, to form a first mixture;
    stirring the first mixture;
    adding organometallic nanorods into the first mixture, to form a second mixture;
    stirring the second mixture at a constant temperature; and
    washing the stirred second mixture with isonamyl acetate by going through centrifugation-redispersion cycles, to remove excess chemical.

* * * * *